United States Patent [19]

Martin

[11] Patent Number: 4,862,180
[45] Date of Patent: Aug. 29, 1989

[54] DISCRETE SOURCE LOCATION BY ADAPTIVE ANTENNA TECHNIQUES

[75] Inventor: Raymond G. Martin, Ellicott City, Md.

[73] Assignee: Westinghouse Electric Corp., Pittsburgh, Pa.

[21] Appl. No.: 744,088

[22] Filed: Jun. 12, 1985

[51] Int. Cl.[4] .............................................. G01S 5/02
[52] U.S. Cl. ................................ 342/417; 342/443; 342/445; 342/376; 342/192; 342/158
[58] Field of Search ............... 343/417, 442, 443, 444, 343/445, 55 A, 368; 342/417, 442, 443, 444, 445, 192, 368, 376

[56] References Cited

U.S. PATENT DOCUMENTS

| Re. 31,772 | 12/1984 | Gerst et al. | 343/443 |
| 3,795,912 | 3/1974 | Pierce et al. | 343/5 SA |
| 3,936,826 | 2/1976 | Hoffman | 343/5 SA |
| 4,005,417 | 1/1977 | Collins | 343/5 SA |
| 4,034,376 | 7/1977 | Barton | 343/444 |
| 4,271,412 | 6/1981 | Glass et al. | 343/5 FT |
| 4,275,399 | 6/1981 | Marom . | |

OTHER PUBLICATIONS

Gabriel, Wm. F., "Spectral Analysis and Adaptive Array Superresolution Techniques," IEEE Proceedings, vol. 68, No. 6, Jun. 1980, pp. 654–666.

Primary Examiner—Thomas H. Tarcza
Assistant Examiner—John B. Sotomayor
Attorney, Agent, or Firm—W. G. Sutcliff

[57] ABSTRACT

A signal processor for radar systems having phased array antenna structures. The processor determines the angle of arrival of the signal from a discrete energy source. The separate elements or output ports of the antenna structure are sampled to form a matrix of signal values. These values are converted into polynomial expressions consistent with one of the spectral estimating methods of maximum entropy, maximum likelihood, and thermal noise. The roots of the polynomial expressions are found and compared to the distance of the unit circle in a pole-zero diagram. Roots sufficiently close to the unit circle are selected as representative of the source signal peaks and the angular directions to such sources are determined by the corresponding angular location of the selected roots in the pole-zero diagram.

15 Claims, 3 Drawing Sheets

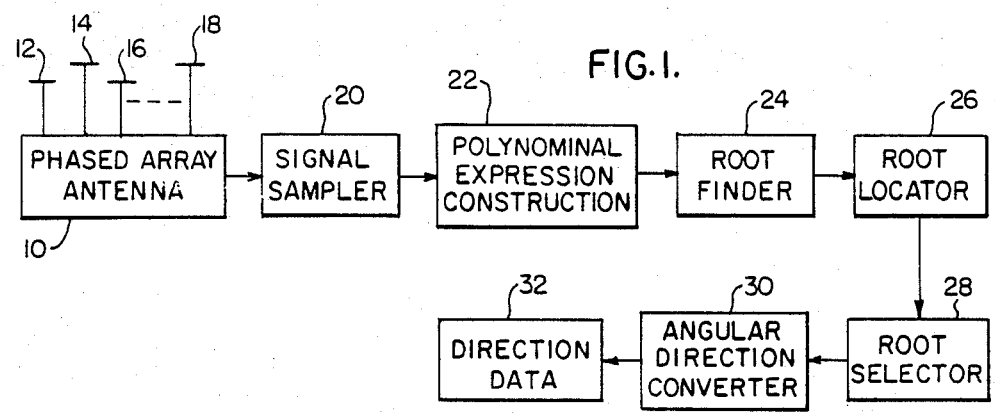
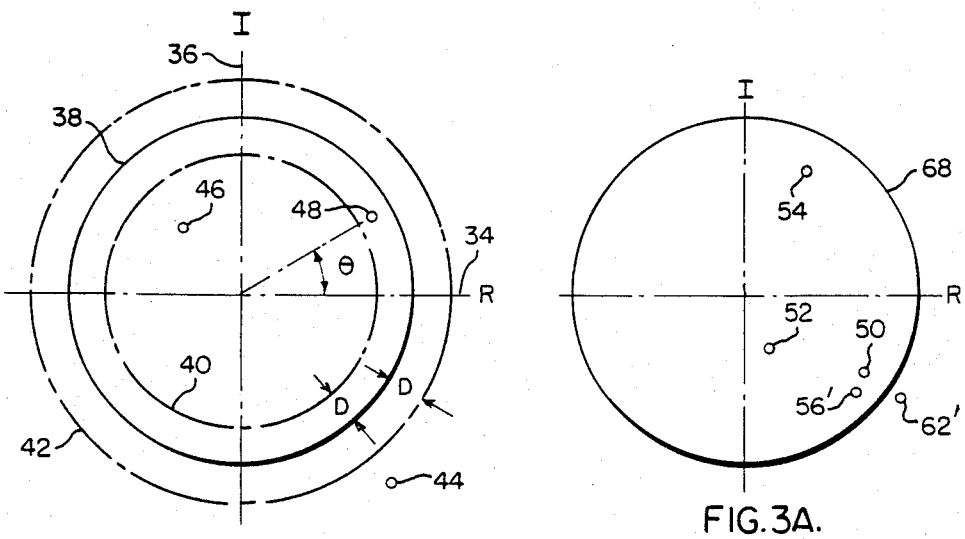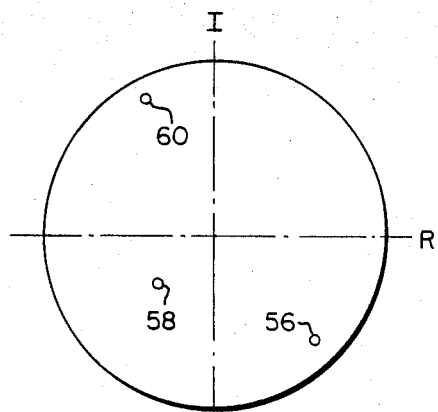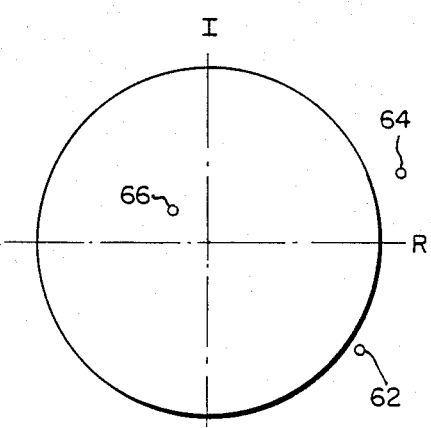

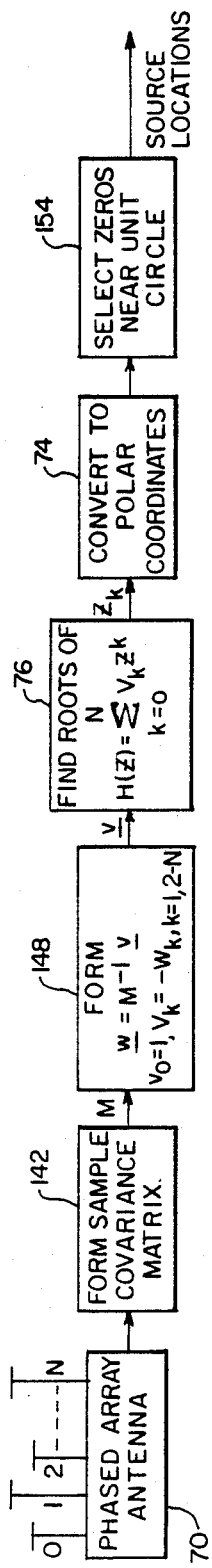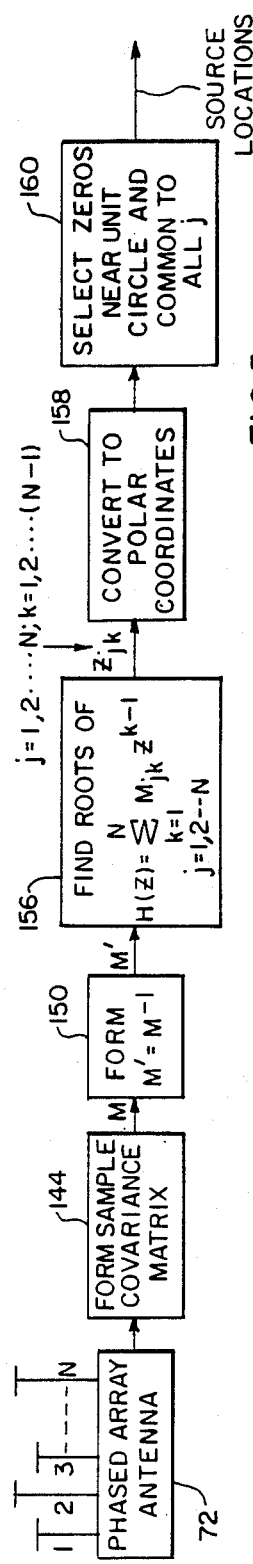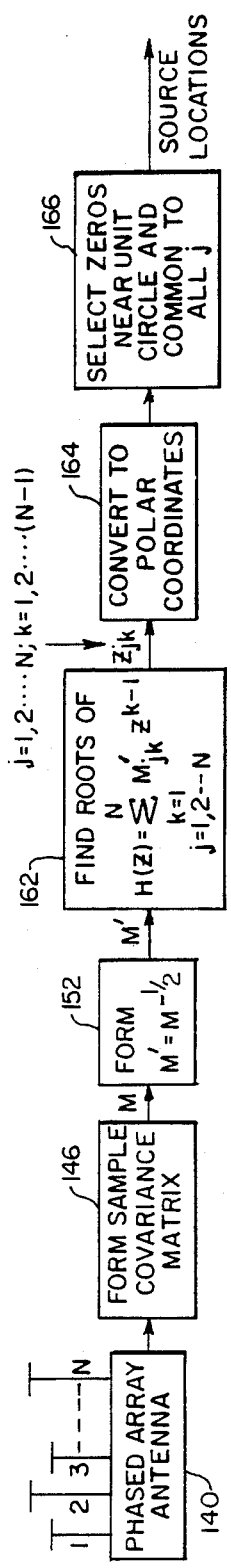

DISCRETE SOURCE LOCATION BY ADAPTIVE ANTENNA TECHNIQUES

BACKGROUND OF THE INVENTION

This invention relates, in general, to radar systems and, more specifically, to apparatus and methods for processing radar signals to determine the direction to the source of the signal energy.

With phased array antenna systems having many separate antenna elements or output ports, a large amount of signal information can be acquired for processing by various methods. Generally, the phase and amplitude of each separate antenna element or output port at different instants of time are used by the prior art processing techniques for obtaining the desired information. The desired information may be the presence of and direction toward two or more signal sources located within the normal bandwidth of the main lobe of radiation of the antenna. These sources may be targets or jammers, or a combination of the two. Discriminating between the sources in regions within the beamwidth of the antenna is known as "super resolution" and requires sophisticated signal processing to see signal sources located so close together. Basically, the process determines the angle or direction from the receiving antenna to the signal sources.

Several processing methods have been used for giving super resolution capabilities to radar signal processors. These methods include the maximum entropy method (MEM), the maximum likelihood method (MLM), and the thermal noise method (TNM). In each case, there is the requirement that matrices formed from the antenna output signal components, including the in-phase (I) and quadrature (Q) components, be mathematically manipulated to produce the signal source direction. Since the size of such matrices is proportional to the number of antenna elements or output ports employed, the number of values which must be mathematically manipulated becomes very large and the processing speed of the processor is required to be high in order to achieve the results in the desired time periods. Consequently, it is desirable, and it is an object of this invention, to provide apparatus and methods for determining the location of signal sources without having to perform all of the mathematical steps on the signal matrices.

SUMMARY OF THE INVENTION

There are disclosed herein new and useful signal processing apparatus and methods for determining the angular direction to a source of signal energy received by a phased array radar antenna. The signal processing techniques may be used with the spectral estimating methods of maximum entropy, maximum likelihood, and thermal noise.

With each of these methods, the separate elements or output ports of the phased array antenna are sampled to obtain values of the amplitude and phase of the signal at the antenna. These values are used in polynomial expressions which are characteristic of the specific estimating method being used. The roots of the expressions are found and compared to the location of the unit circle in the pole-zero diagram of the solution. Roots which are represented by zeros within a predetermined distance of the unit circle are considered representative of the source signals. The angular direction to the sources are determined by the corresponding angular direction of the selected roots in the pole-zero diagram.

In the spectral estimating methods which produce more than one pole-zero diagram, a common arrangement or placement of the corresponding roots is also used in the criteria to select the roots which are representative of the source signal.

The novel signal processor disclosed herein provides the approximate direction to the signal source without all of the computation required by prior art systems. The techniques disclosed give approximate angular directions to the sources but, nevertheless, they are of sufficiently high accuracy in actual practice to be very useful.

BRIEF DESCRIPTION OF THE DRAWINGS

Further advantages and uses of this invention will become more apparent when considered in view of the following detailed description and drawings, in which:

FIG. 1 is a block diagram showing a radar system constructed according to this invention;

FIG. 2 is a Z-transform, pole-zero diagram illustrating root selection process according to one embodiment of the invention;

FIGS. 3A, 3B and 3C are Z-transform, pole-zero diagrams illustrating the root selection process according to another embodiment of the invention;

FIG. 4 is a block diagram illustrating the method of this invention when using the maximum entropy method of spectral estimating;

FIG. 5 is a block diagram illustrating the method of this invention when using the thermal noise method of spectral estimating;

FIG. 6 is a block diagram illustrating the method of this invention when using the maximum likelihood method of spectral estimating.

DESCRIPTION OF THE PREFERRED EMBODIMENTS

Figure 7:
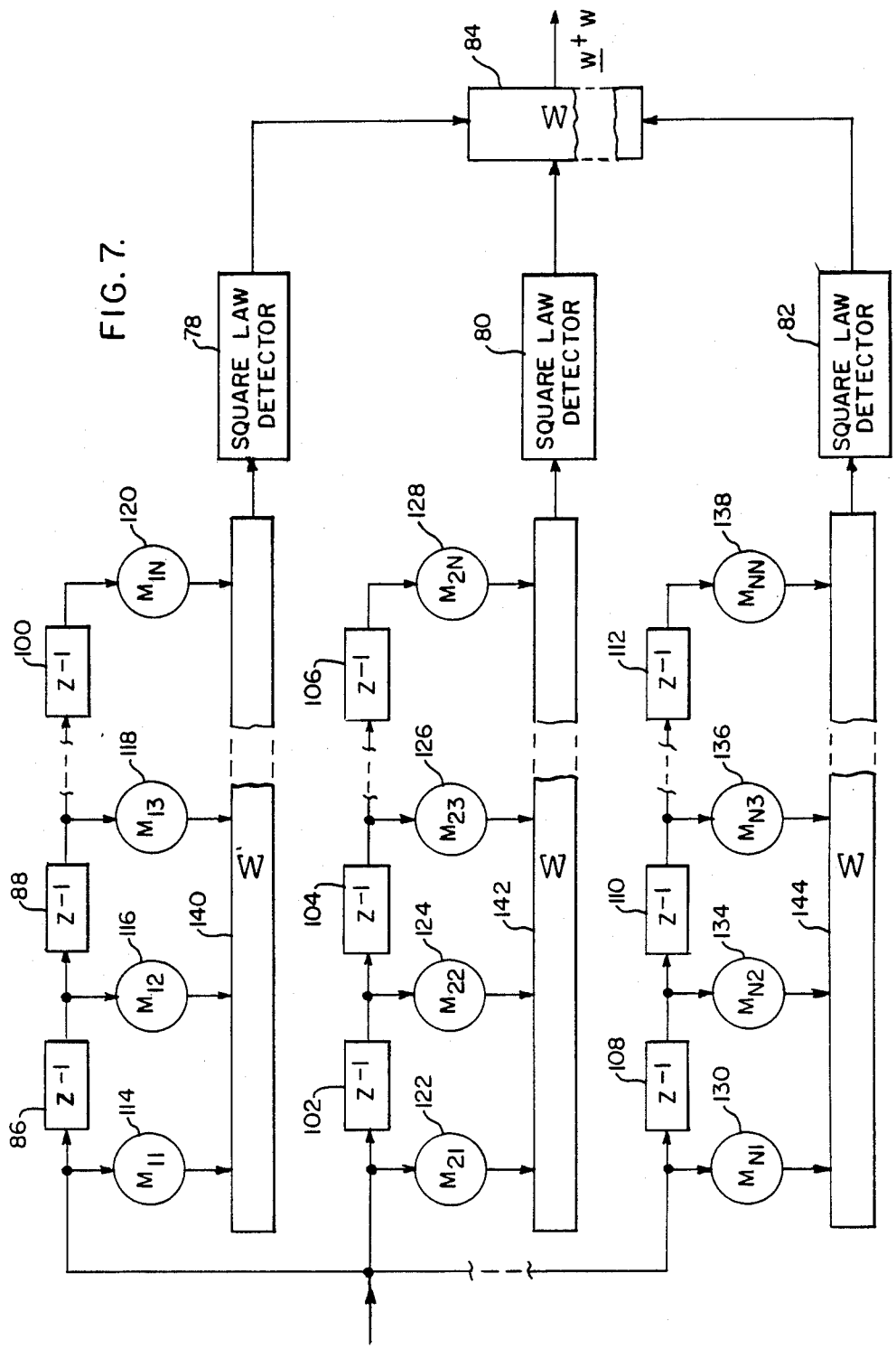
FIG. 7 is a diagram of a filter which is applicable to the use of the present invention with the thermal noise method of spectral estimating.

Throughout the following description, similar reference characters refer to similar elements or members in all of the Figures of the drawing.

Referring now to the drawing, and to FIG. 1 in particular, there is shown a block diagram of a radar system constructed according to this invention. The phased array antenna 10 includes separate antenna elements or output ports, such as the antenna elements 12, 14, 16 and 18. Such antenna elements could be distinct individual radiating elements or individual radiating elements in the form of overlapped subarrays. The signal sampler 20 obtains the phase and amplitude values of the signals captured by the antenna elements and transfers that data to the next stage of the system. The data at this point in the processing is converted into the form of a covariance matrix, with the elements of the matrix corresponding to the values of the signal samples. It is emphasized that the separate antenna elements could be effectively provided by a common antenna structure having multiple ports for connection thereto, and that the invention is applicable to phased array antennas with either type or with similar functioning antenna elements.

The matrix elements are constructed into polynomial expressions according to block 22, with the exact form of the expressions being dependent upon the spectral estimating method being used, as more fully explained later herein. Regardless of the form of the polynomial expressions, the system of this invention finds the roots of the expressions, as shown in block 24. Next, the location of the roots, or zeros, with respect to the unit circle of a Z-transform, pole-zero diagram is accomplished by the root locator 26. Depending upon the criteria used, the roots which satisfy the criteria are selected by the root selector 28 and the angular direction to each selected root on the pole-zero diagram is measured or calculated. Because of the direct correlation between direction to the root on the pole-zero diagram and the physical direction to the signal source sampled by the phased array antenna elements, the angular direction converter 30 changes the root location to direction data 32 for further use by the radar system and/or operator.

Although described thus far in terms of manipulating matrix values into polynomial expressions, finding the roots to the expressions, and selecting roots which meet previously established selection criteria, it is emphasized that these functions may be performed by programs in a general purpose computer system, or other digital or analog processing techniques. Actual plotting of the roots on a pole-zero diagram is not the preferred way of implementing this invention. Rather, computer processing of the signal values to perform these functions constitutes the preferred embodiment of the invention, and the specific programming steps to provide these individual functions would be obvious to those skilled in the art.

The location of the roots near the unit circle corresponds to the angular location of signal sources causing electromagnetic energy to be directed to the antenna elements. In the case of passive targets, this energy is reflected signals from the radar transmitter and, in the case of radar jammers, this energy is usually emanating from the jamming source. The mathematical analysis of this invention, included later herein, explains in more detail the theory of the apparatus and methods taught by this invention. It is emphasized that the description of the embodiment herein is limited to a one-dimensional discussion of the determination of the source direction. In actual implementation, two-dimensional direction determination would be used wherein the teachings of this invention would be used for each dimension without departing from the scope of the invention.

FIG. 2 is a Z-transform, pole-zero diagram illustrating the root selection process according to an embodiment of this invention when all of the roots are contained in one pole-zero diagram. Axis 34 is the real axis and axis 36 is the imaginary axis. The unit circle 38 is between limit circles 40 and 42 which indicate the distance from the unit circle 38 within which a root is considered as being representative of a zero or null of the transform functions. Typical roots are shown as zeros 44, 46 and 48 in FIG. 2. Zero 44 is outside the circle 42 and zero 46 is inside the circle 40. Therefore, both of these zeroes are further from the unit circle than the deviation distance D. Thus, neither are considered as representing directions to sources of signal energy. However, zero 48 is sufficiently close to the unit circle 38 and is considered as representing a signal source. The direction to the signal source can be determined by use of the angle $\theta$ made with the real axis 34.

Some of the polynomial expressions produce more than one set of roots associated with the polynomial expressions. FIGS. 3A, 3B and 3C illustrate such a case where the roots appear in three pole-zero diagrams.

These roots are represented by zeros 50 through 66. In determining if the zeros represent signal sources, a two-step criterion is used. In order to be a zero representative of a signal source, the zero must be both close to the unit circle and similarly or commonly located within each of the pole-zero diagrams. Zeros 50, 56 and 62 meet these requirements. Zeros 52, 54, 58, 60, 64 and 66 do not meet these requirements. As shown in FIG. 3A, zeros 50, 56′ and 62′ are all close to the unit circle 68 and are commonly located with respect to angular position. The primed zeros in FIG. 3A correspond to the location of the same unprimed zeros in FIGS. 3B and 3C. Thus, they satisfy the closeness and commonality criteria and are considered to be indicative of the direction of the signal source.

The invention disclosed herein may be better understood by a mathematical analysis of three methods with which the invention may be used. FIG. 4 is a block diagram illustrating the use of this invention with the maximum entropy method (MEM). With $N+1$ beams of the antenna 70 having uniformly spaced phase centers, the spatial spectrum function is:

$$S(\phi) = 1./ \left| 1 - \sum_{k=1}^{N} w_k s_k \right|^2 \quad (1A)$$

where $\underline{w}$ is a vector of complex weights, $\underline{s}$ is a steering vector with elements of the form:

$$s_k = e^{-jk\phi} \quad (2A)$$

and $\phi$ is proportional to $\sin \theta$, where $\theta$ is the spatial angle.

For the thermal noise method shown in FIG. 5, the spatial spectrum function is:

$$S_{TN}(\phi) = \frac{1}{w^+ w} \quad (3A)$$

where the weight vector $\underline{w}$ is:

$$\underline{w} = M^{-1} s^* \quad (4A)$$

$w^+$ is the conjugate transpose of $\underline{w}$, and M is the covariance matrix (or sample covariance matrix) associated with the source distribution. For an N - beam system as illustrated by antenna 72, M is an $N \times N$ matrix and the index, k, of $s_k$ runs from zero to $(N-1)$.

For the maximum likelihood method shown in FIG. 6, the spatial spectrum function is:

$$S_{MLM}(\phi) = \frac{1}{S^t M^{-1} s^*} \quad (5A)$$

It can be seen from equations 1A and 2A that $S_{MEM}(\phi)$ is the reciprocal of the power response of a finite impulse response (FIR) filter having tap weights that can be represented by the vector $\underline{v}$, with elements $v_k$, $k = 0, 1, 2 \ldots N$, where $v_0 = 1$ and $v_k = -w_k$, $k = 1, 2, \ldots N$. The peaks of $S_{MEM}$, therefore, correspond to minima, or zeroes of the filter response:

$$S_v(\phi) = \left| \sum_{k=0}^{N} v_k e^{-jk\phi} \right|^2 \quad (6A)$$

It should be noted that evaluation of equation 6A at uniformly spaced values of $\phi$ can be accomplished efficiently by use of the fast Fourier transform (FFT) algorithms, but there is no guarantee that the desired minima will fall on one of the sampled values. If they do not, then some form of subsidiary centroiding method is required, or more closely spaced data points must be calculated. It is more attractive to find the locations of the minima (or zeros) directly by the computationally simple method of this invention.

Direct expansion of equation 6A produces, in general, a function of the form:

$$S_v(\phi) = a_o + \sum_{k=1}^{N} [a_k \cos k\phi + b_k \sin k\phi] \quad (7A)$$

where the coefficients $a_k$ and $b_k$ are functions of the complex vector elements $v_k$ only. The sines and cosines of the multiple angles $k\phi$ ($k = 2, 3 \ldots N$) can be further expanded as functions of $\cos \phi$, $\sin \phi$, and their integer powers up to order N. By using the substitutions $x = \cos \phi$ and $\sqrt{1-x^2} = \sin \phi$, the equation can be further reduced to a polynomial in x. However, the existence of the radical in the expression for $\sin \phi$ requires that a squaring operation must, in general, be employed in the reduction process. This produces a polynomial equation in x, of order 2N, and may introduce as many as N spurious roots that do not correspond to solutions of equation 7A. The resultant polynomial, and its first two derivatives, may then be solved to determine the zeros, if any, and/or the minima, of the polynomial; but the solutions must be substituted back into equation 7A to eliminate the spurious roots. According to the prior art, the computational procedure required by the above method is rather complex.

The present invention results from consideration of the Z-transform of the FIR filter having tap weights $\underline{v}$. It is:

$$H(z) = \frac{1}{z^N} \sum_{k=0}^{N} v_k z^{(N-k)} \quad (8A)$$

Moreover $$S_v(\phi) = |H(z)|^2 \, z = e^{j\phi} \quad (9A)$$

The behavior of $S_v(\phi)$ is, therefore, determined completely by the locations, in the complex Z-plane, of the zeros of equation 8A. In particular, those zeros that are on or close to the unit circle produce zeros or minima in equation 9A, each corresponding to one of the desired peaks of equation 1A.

Each point on the unit circle corresponds to a specific value of $\phi$, by means of the relationship:

$$z = e^{j\phi} \quad (10A)$$

When a particular zero, $Z_k$, is close to, but not actually on, the unit circle, the corresponding minimum in equation 9A will occur at a value of $\phi$ that is close to:

$$\phi_k = \tan^{-1} [\text{Im}(Z_k)/\text{Re}(Z_k)] \quad (11A)$$

The true minimum will, however, be somewhat influenced by the presence of other zeros elsewhere in the Z-plane. In practice, when one is seeking peaks corresponding to relatively strong discrete sources in the adaptive antenna case, the interaction between zeros is very small, and the locations of the individual $\phi_k$ correspond to very good approximations for the source locations. The quantity:

$$d_k = 1 - |Z_k| \quad (12A)$$

is a measure of the closeness of $Z_k$ to the unit circle. The magnitude of $z_k$ is therefore an indication of the validity of the approximation in equation 11A. The selection of zeros that lie within a specific distance of the unit circle (i.e., within a ring centered on the unit circle as shown in FIG. 2) provides a method of choosing only those zeros which will provide good approximations to resolvable peaks in equations 6A and 1A. Note that equations 11A and 12A effectively involve a conversion from rectangular to polar coordinates, as shown by block 74 in FIG. 4.

The approximate method described above has been evaluated in a three-beam system (N=2) and been found to give excellent results. Moreover it is computionally very simple in this case, since determination of the zeros of equation 8A involves merely the solution of a quadratic equation with complex coefficients, as shown by block 76. The usual formula for the solution of a quadratic equation applies even when the coefficients are complex. In the general case, the zeros of equation 8A are the roots of an (N−1) order polynomial in Z with complex coefficients.

The denominator of equation 3A is equal to the sum of the squares of the absolute values of the N elements of the weight vector $\underline{w}$. However, examination of equation 4A shows that each element of $\underline{w}$, $w_k$, can be considered as the output of an N-element FIR filter having tap weights equal to the element values in the $k^{th}$ row of $M^{-1}$. The inputs to each of these filters are the same, namely the conjugate steering vector $\underline{s}^*$. The denominator of equation 3A can, therefore, be represented as the combined output of the N filters, where the combination comprises summation following square-law detection.

FIG. 7 illustrates transversal filters arranged to give the combined output ($\underline{w}^+\underline{w}$). The outputs of the square law detectors 78, 80 and 82 are summed by the summer 84 to provide the desired output. The delay elements 86 through 112 and the tap weight elements 114 through 138 direct the input signal to the summers 140, 142 and 144. The circuit of FIG. 7 is of interest, not only because it leads to an approximate Z-transform method for locating the sources directly, as will be described in more detail later, but also because it provides a means of computing the complete response by efficient means. Each of the N separate filter outputs can be computed, at any desired density of sample points in the spectrum, by use of the FFT algorithm, as was discussed previously for the single filter MEM case. The sum of the squares of the absolute values of the outputs of all N filters then provides values of the denominator of equation 3A, at the same set of equally spaced points in the spectrum. Minima in these sum values correspond to the desired peaks, within the accuracy of the sample spacings.

To determine the approximate locations of the sources directly, it is noted that the peaks of $S_{TN}(\phi)$, corresponding to minima of the quantity $\underline{w}^+\underline{w}$, will occur at those spatial frequencies where all the filters in FIG. 7 simultaneously produce low outputs. In terms of the Z-transform representation of the filter responses, this will occur when each of the filters has a zero on or close to that point on the unit circle that corresponds to the spatial frequency of a peak in $S_{TN}$.

For a system with N beams, $M^{-1}$ will be an $N \times N$ matrix. Each of the filters in FIG. 7 will have N taps, and hence each will exhibit $(N-1)$ zeros. Only if there are $(N-1)$ discrete sources present will it be necessary for the zeros of each of the filters to be in the same, or closely the same, locations. When there are less than $N-1$ sources present, each of the filters will have one or more zeros that are not closely in common with those of all the other filters.

The invention uses these considerations to develop an approximate method of determining the peaks of $S_{TN}(\phi)$, and hence of the source locations. It comprises finding the zero locations of the N filters with tap weights corresponding to the rows of $M^{-1}$, followed by a determination of the number and the location of those zeros which are both close to the unit circle and common to all the filters.

Any zero which is determined to be closely in common between all N filters and, hence, to correspond to a peak in $S_{TN}$, will in practice have a slightly different value for each of the N filters, due to statistical variations in the formation of the sample covariance matrix from the antenna output data. An average value for the common value of $\phi$, corresponding to the source location, must therefore be taken. In general, each of the filters can have different gain factors, as can be characterized, for example, by their noise power gains. Noise power gain is defined as the sum of the squares of the absolute values of the filter tap weights. A reasonable procedure is, therefore, to form a weighted average of the source locations as determined by the individual filters, using, for example, the noise power gain as weights in the averaging process.

According to the maximum likelihood method shown in FIG. 6, a comparison of equations 3A and 5A shows that they are of the same functional form. This can be seen by combining equations 3A and 4A, noting that $M^{-1}$ is Hermitian, to give:

$$S_{TN}(\phi) = \frac{1}{(s^t M^{-1})(M^{-1} s^*)} \quad (13A)$$

and to express equation 5A as:

$$S_{MLM}(\phi) = \frac{1}{(s^t M^{-\frac{1}{2}})(M^{-\frac{1}{2}} s^*)} \quad (14A)$$

Thus, equations 13A and 14A differ only to the extent that the matrix involved in equation 14A is $M^{-\frac{1}{2}}$ as compared with $M^{-1}$ in equation 13A.

The methods of analysis described for the thermal noise method of FIG. 5 are, therefore, equally applicable to the MLM method, except that the covariance matrix data must be used to first generate $M^{-\frac{1}{2}}$ in the MLM case, rather than $M^{-1}$ for the TN case. Generation of $M^{-\frac{1}{2}}$ can be accomplished by first forming the spectral representation of M, namely:

$$M = \sum_{R=1}^{N} \lambda_k E_k \quad (15A)$$

where the $\lambda_k$ are the eigen values of M, and the idempotents, $E_k$, are:

$$E_k = \underline{e}_k \underline{e}_k^+ \quad (16A)$$

where each of the N vectors $\underline{e}_k$ is an eigenvector of M, corresponding to the eigenvalue $\lambda_k$. $M^{-\frac{1}{2}}$ is then given by:

$$M^{-\frac{1}{2}} = \sum_{k=1}^{N} (\lambda_k)^{-\frac{1}{2}} E_k \quad (17A)$$

In all of the estimating methods shown by FIGS. 4, 5 and 6, the phased array antennas, such as antenna 140 of FIG. 6, provide data for the formation of matrices, such as shown by blocks 142, 144 and 146 of FIGS. 4, 5 and 6, respectively. The form of the matrix used is indicated by blocks 148, 150 and 152 for each method. According to blocks 74, 76 and 154 through 166, shown in FIGS. 4, 5 and 6, the roots of the polynomial expressions are found, converted to polar coordinates, and selected as desired zeros when a nearness and commonality criterion is met.

It is emphasized that numerous changes may be made in the above-described system within the scope of the invention. Since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A radar receiving system suitable for determining the approximate direction to a source of signal energy, said system comprising:

a phased array antenna having a plurality of separate antenna elements;

means for sampling the signal at the separate elements to provide values corresponding to the sampled signals;

means for forming at least one polynomial expression, with the coefficients of said expression being derived from said values;

means for finding the roots of said polynomial expression;

means for determining the closeness of said roots to the unit circle in at least one complex plane;

means for selecting the roots Which satisfy a predetermined closeness criterion; and means for providing the angular direction in the complex plane to said selected roots, said angular direction of the selected roots corresponding to the angular direction to the source of signal energy.

2. The radar receiving system of claim 1 wherein the values provided by the sampling means are complex values corresponding to the amplitude and phase of the signal at the separate elements.

3. The radar receiving system of claim 1 wherein the selecting means includes means for measuring the distance of the root from the unit circle and for comparing that distance with a maximum value, with roots having a distance less than said maximum value satisfying the closeness criteria.

4. The radar receiving system of claim 1 including means for converting the roots to a polar coordinate system.

5. The radar receiving system of claim 1 wherein the polynomial expression is in the form:

$$H(Z) = \sum_{k=0}^{N} V_k Z^k$$

6. The radar receiving system of claim 1 wherein more than one polynomial expression is formed.

7. The radar receiving system of claim 6 wherein the polynomial expressions are in the form:

$$H(Z) = \sum_{k=1}^{N} m_{jk} Z^{k-1} \text{ for } j = 1, 2 \ldots N$$

8. The radar receiving system of claim 1 wherein the determining means determines the closeness of the roots to the unit circle in a plurality of complex planes.

9. The radar receiving system of claim 8 wherein the selecting means includes means for measuring the distance of the root from the unit circles of each of the complex planes, comparing those distances to a maximum value, and looking for a common range of angular placement of corresponding roots in all of the complex planes.

10. A method of determining the approximate direction to a source of signal energy in a radar system having an antenna with a plurality of separate antenna elements, said method including the steps of:
sampling the signal at the separate radar antenna elements to obtain sample values;
forming a covariance matrix from said sample values;
deriving at least one polynomial expression from the values in said covariance matrix;
finding the roots of said polynomial expressions;
determining the closeness of the roots to the unit circle in a complex plane; and
correlating the location of any roots determined to be within a predetermined value of closeness to the unit circle with the actual direction to the signal source.

11. The method of claim 10 including the step of converting the roots to a polar coordinate system.

12. The method of claim 10 wherein more than one polynomial expression is derived from the values in the covariance matrix.

13. The method of claim 12 including the steps of similarly determining the closeness of the roots to the unit circle in all of the complex planes which contain the roots, and comparing the angular placement of corresponding roots with respect to each other in each complex plane.

14. The method of claim 12 wherein the coefficients of the polynomial expressions are derived from values in the inverse of the covariance matrix.

15. The method of claim 12 wherein the coefficients of the polynomial expressions are derived from values in the square root of the inverse of the covariance matrix.

* * * * *